(12) United States Patent
Zhu et al.

(10) Patent No.: US 11,326,919 B2
(45) Date of Patent: May 10, 2022

(54) CORIOLIS MASS FLOW METER HAVING A CENTRAL VIBRATION SENSOR AND METHOD FOR DETERMINING THE VISCOSITY OF THE MEDIUM USING CORIOLIS MASS FLOW METER

(71) Applicant: Endress+Hauser Flowtec AG, Reinach (CH)

(72) Inventors: Hao Zhu, Freising (DE); Bernd Josef Schäfer, Pliezhausen (DE)

(73) Assignee: Endress+Hauser Flowtec AG, Reinach (CH)

( * ) Notice: Subject to any disclaimer, the term of this patent is extended or adjusted under 35 U.S.C. 154(b) by 183 days.

(21) Appl. No.: 16/770,394

(22) PCT Filed: Nov. 13, 2018

(86) PCT No.: PCT/EP2018/081070
§ 371 (c)(1),
(2) Date: Jun. 5, 2020

(87) PCT Pub. No.: WO2019/110251
PCT Pub. Date: Jun. 13, 2019

(65) Prior Publication Data
US 2021/0164821 A1   Jun. 3, 2021

(30) Foreign Application Priority Data
Dec. 6, 2017 (DE) .................. 10 2017 129 036.2

(51) Int. Cl.
*G01F 1/84*     (2006.01)

(52) U.S. Cl.
CPC .......... *G01F 1/8413* (2013.01); *G01F 1/8436* (2013.01); *G01F 1/8477* (2013.01)

(58) Field of Classification Search
None
See application file for complete search history.

(56) References Cited

FOREIGN PATENT DOCUMENTS

| CN | 1643346 A | 7/2005 |
|---|---|---|
| CN | 101147047 A | 3/2008 |
| CN | 101198843 A | 6/2008 |
| CN | 101646925 A | 2/2010 |
| DE | 69713074 T2 | 10/2002 |
| DE | 102007024275 A1 | 11/2008 |
| DE | 102009012474 A1 | 9/2010 |
| DE | 102010035341 A1 | 3/2012 |

(Continued)

*Primary Examiner* — Harshad R Patel
(74) *Attorney, Agent, or Firm* — Mark A. Logan; Endress+Hauser (USA) Holding Inc.

(57) ABSTRACT

A method for determining the viscosity of a medium using a Coriolis mass flow meter comprises exciting bending vibrations in the measuring tube in a symmetrical bending vibration use mode using an exciter arranged symmetrically in relation to a longitudinal direction of the measuring tube; detecting sensor signals of a central vibration sensor also arranged symmetrically in relation to a longitudinal direction of the measuring tube; detecting sensor signals of a vibration sensor on the inlet side and of a vibration sensor on the outlet side; determining a phase relation or time delay between the sensor signals of the central vibration sensor and a symmetrical function of the sensor signals on the inlet-side and outlet-side vibration sensors; and determining the viscosity of the medium as a function of the phase relation or time delay.

10 Claims, 2 Drawing Sheets

(56) References Cited

FOREIGN PATENT DOCUMENTS

| | | | |
|---|---|---|---|
| EP | 1154243 | A1 | 11/2001 |
| EP | 2130005 | A1 | 12/2009 |
| WO | 9852000 | A2 | 11/1998 |
| WO | 2010103075 | A1 | 9/2010 |

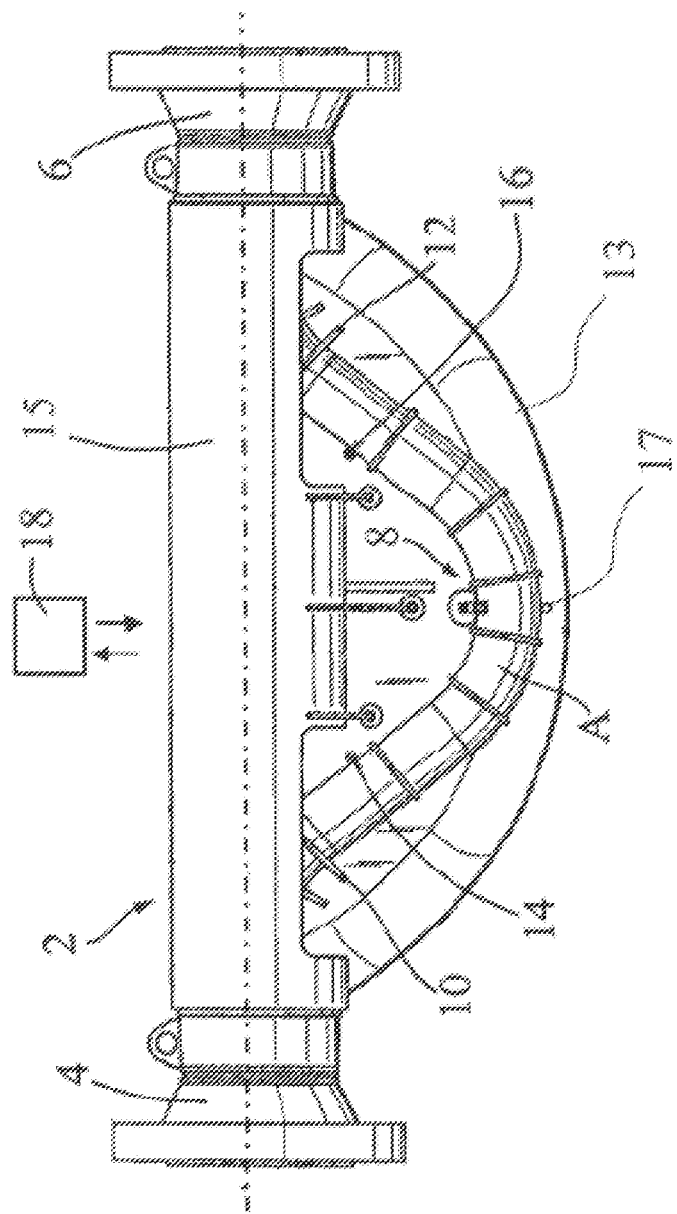

CORIOLIS MASS FLOW METER HAVING A CENTRAL VIBRATION SENSOR AND METHOD FOR DETERMINING THE VISCOSITY OF THE MEDIUM USING CORIOLIS MASS FLOW METER

CROSS-REFERENCE TO RELATED APPLICATIONS

The present application is related to and claims the priority benefit of German Patent Application No. 10 2017 129 036.2, filed on Dec. 6, 2017 and International Patent Application No. PCT/EP2018/081070 filed on Nov. 13, 2018, the entire contents of which are incorporated herein by reference.

TECHNICAL FIELD

The present invention relates to a method for determining the viscosity of a medium by means of a Coriolis mass flow meter and to a Coriolis mass flow meter for carrying out the method.

BACKGROUND

Coriolis mass flow meters of the type in question typically comprise at least one measuring tube, which is mounted so as to be able vibrate, for guiding a medium between an inlet-side opening of the measuring tube and an outlet-side opening of the measuring tube, at least one exciter for exciting bending vibrations of the measuring tube in a symmetrical bending vibration wanted mode, wherein the exciter is arranged symmetrically, that is, in the measuring tube center, in relation to a longitudinal direction of the measuring tube, at least one inlet-side vibration sensor and at least one outlet-side vibration sensor, wherein, in relation to the longitudinal direction of the measuring tube, the positions of the inlet-side and outlet-side vibration sensors are arranged symmetrically with respect to one another, and an operating and evaluation circuit, which is configured to emit an excitation signal for driving the exciter for exciting bending vibrations of the measuring tube in a symmetrical bending vibration wanted mode, for ascertaining points in time of the zero crossings of the measuring tube at the positions of an inlet-side vibration sensor and an outlet-side vibration sensor based on signals of the inlet-side and the outlet side vibration sensors, and for ascertaining a phase relationship or a time delay between the points in time of the zero crossings of the inlet-side and outlet-side vibration sensors and the point in time of the zero crossing of the measuring tube in the measuring tube center.

The signals of the inlet-side and outlet-side vibration sensors have a symmetrical component, which corresponds to the bending vibration wanted mode and on which a flow-dependent, antisymmetrical component is superimposed. Coriolis mass flow meters comprising a third, central vibration sensor are known, wherein the central vibration sensor is arranged symmetrically in relation to a longitudinal direction of the measuring tube. By repeatedly comparing a phase relationship between the inlet-side and outlet-side vibration sensors on the one hand, and a phase relationship between the respective sensor signals of one of these vibration sensors with the sensor signals of the central sensor, the mass flow meter can be monitored for changes in the oscillation behavior thereof that are relevant to the flow measurement. This is described, among other things, in the unexamined patent applications DE 10 2007 024 275 A1 and WO 98/52000 A2.

SUMMARY

In addition to mass flow, Coriolis mass flow meters can also measure the density and viscosity of a medium. The density measurement is usually carried out based on a measurement of wanted mode natural frequencies. The viscosity is accessible by way of the quality of a bending vibration wanted mode, for example by way of a ratio of exciter output and oscillation amplitude. However, precise amplitude measurements are rather atypical for Coriolis mass flow meters, since the essential measurement variables are ascertained over times or frequencies. An interest therefore exists in a viscosity measurement which is carried out independently of amplitude measurements.

It is therefore the object of the present invention to provide such a method for viscosity measurement by means of a Coriolis mass flow meter and a Coriolis mass flow meter for carrying out the method.

The method according to the invention for determining the viscosity of a medium by means of a Coriolis mass flow meter comprises:

exciting bending vibrations of at least one measuring tube of the mass flow meter in a symmetrical bending vibration wanted mode by means of an exciter arranged symmetrically in relation to a longitudinal direction of the measuring tube, wherein the measuring tube is used to guide the medium between an inlet opening and an outlet opening of the measuring tube;

detecting sensor signals of a central vibration sensor, wherein the central vibration sensor is arranged symmetrically in relation to a longitudinal direction of the measuring tube;

detecting sensor signals of an inlet-side vibration sensor and an outlet-side vibration sensor, wherein, in relation to the longitudinal direction of the measuring tube, the positions of the inlet-side and outlet-side vibration sensors are arranged symmetrically with respect to one another; ascertaining a phase relationship or time delay between the sensor signals of the central vibration sensor and a symmetric function of the sensor signals of the inlet-side and outlet-side vibration sensors; and ascertaining the viscosity of the medium as a function of this phase relationship or time delay.

In a refinement of the invention, the ascertainment of a phase relationship or time delay between the sensor signals of the central vibration sensor and a symmetric function of the sensor signals of the inlet-side and outlet-side vibration sensors comprises:

ascertaining the point in time of the zero crossing of the measuring tube at the location of the exciter by means of the central vibration sensor;

ascertaining the points in time of the zero crossings of the measuring tube at the positions of the inlet-side vibration sensor and the outlet-side vibration sensor; and ascertaining a time delay between a mean point in time of the zero crossings of the inlet-side and outlet-side vibration sensors and the point in time of the zero crossing of the measuring tube in the measuring tube center.

Zero crossings refer to a respective sensor moving through the equilibrium position thereof. At this point, the vibration energy of the measuring tubes is essentially completely present in kinetic energy, so that the velocity-dependent signals of the electrodynamic vibration sensors have maxima.

In a refinement of the invention, the viscosity is calculated as a function of the phase relationship or time delay, wherein the function, especially, includes a polynomial. The calculation by means of a function is preferred; in principle, it is also possible to record viscosity values in tabular form, so that a respective viscosity value is assigned to certain intervals of phase relationships or time delays. Interpolation can optionally also be carried out between table values.

In a refinement of the invention, the phase relationship or delay has a cross sensitivity to the density of the medium, wherein a density measurement value for the medium is determined based on a vibration frequency of the bending vibration wanted mode, especially, a wanted mode natural frequency, and wherein this cross sensitivity is taken into account in the ascertainment of the viscosity.

For this purpose, for example, the time delay can be normalized using a polynomial in a density-dependent period duration of a bending vibration wanted mode, the normalized time delay then being included in the viscosity determination.

In a refinement of the invention, first an apparent mass flow measurement value is calculated based on the phase relationship or delay, and then the viscosity is determined based on the apparent mass flow measurement value.

In a refinement of the invention, the viscosity is determined at a mass flow rate of zero.

A Coriolis mass flow meter according to the invention, especially, for carrying out the method according to the invention, comprises:

at least one measuring tube, mounted so as to be able to vibrate, for guiding a medium between an inlet-side opening of the measuring tube and an outlet-side opening of the measuring tube;

at least one exciter for exciting bending vibrations of the measuring tube in a symmetrical bending vibration wanted mode, wherein the exciter is arranged symmetrically in relation to a longitudinal direction of the measuring tube, i.e. in the measuring tube center;

at least one central vibration sensor, wherein the central vibration sensor is arranged symmetrically in relation to a longitudinal direction of the measuring tube, i.e. in the measuring tube center;

at least one inlet-side vibration sensor and at least one outlet-side vibration sensor, wherein, in relation to the longitudinal direction of the measuring tube, the positions of the inlet-side and outlet-side vibration sensors are arranged symmetrically with respect to one another; and an operating and evaluation circuit, which is configured to:

emit an exciter signal for driving the exciter for exciting bending vibrations of the measuring tube in a symmetrical bending vibration wanted mode;

detecting sensor signals of the central vibration sensor;

detecting sensor signals of the inlet-side vibration sensor and the outlet-side vibration sensor;

ascertaining a phase relationship or time delay between the sensor signals of a central vibration sensor and a symmetric function of the sensor signals of the inlet-side and outlet-side vibration sensors; and ascertaining the viscosity of the medium as a function of this phase relationship or time delay.

In a refinement of the invention, the at least one measuring tube is bent in the rest position thereof.

In a refinement of the invention, the operating and evaluation circuit is configured to determine a density measurement value for the medium based on a vibration frequency of the bending vibration wanted mode, especially, a wanted mode natural frequency, so as to take a cross sensitivity of the phase relationship or delay to the density of the medium into account in the ascertainment of the viscosity.

In a refinement of the invention, the operating and evaluation circuit is configured to first calculate an apparent mass flow measurement value based on the phase relationship or delay, and then to determine the viscosity based on the apparent mass flow measurement value. This procedure is advantageous in that the operating and evaluation circuit is primarily configured to calculate mass flow measurement values. It is therefore an obvious choice to first convert the phase relationship or delay on an existing processing path into a digitally available, apparent mass flow measurement value, which then serves as the basis for the determination of the viscosity.

BRIEF DESCRIPTION OF THE DRAWINGS

The invention will now be explained on the basis of the exemplary embodiments shown in the drawings. Shown are:

FIG. 1 shows a schematic illustration of an exemplary embodiment of a Coriolis mass flow meter according to the present disclosure;

DETAILED DESCRIPTION

Figure 3:
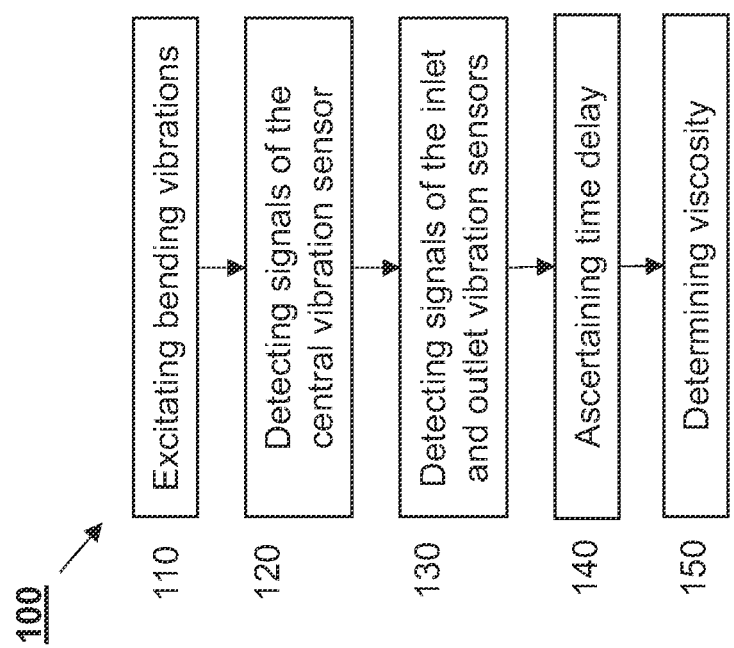
FIG. 3 shows a flow chart of an exemplary embodiment of the method according to the present disclosure.

FIG. 1 shows an exemplary embodiment of a Coriolis mass flow meter 2 according to the invention, comprising two parallel measuring tubes A, which are bent in the rest position, of which only one can be seen in the drawing. The Coriolis mass flow meter 2 can be inserted into a pipe (not shown), so that the medium flowing in the pipe is able to flow through the two measuring tubes A and B. Flow dividers or collectors 4, 6, which are connected to one another by a rigid carrier tube 15, are provided on the inlet side and on the outlet side of the measuring tubes A. The two measuring tubes A are mechanically coupled on the inlet side and on the outlet side by corresponding coupling elements 10, 12, whereby a free vibration length of the measuring tubes A between the coupling elements 10, 12 is defined. The measuring tubes A have an arc, which extends outside the carrier tube and is protected from environmental conditions by a protective housing 13, which is welded to the carrier tube 15.

An electrodynamic exciter 8 is arranged between the two measurement tubes A. In the present embodiment, the exciter 8 is positioned symmetrically at an apex of the measuring tube arcs, in relation to the longitudinal direction of the measuring tubes, i.e. in the measuring tube center. The two measurement tubes A and B can be periodically deflected in relation to one another by the exciter 8 so that they carry out bending vibrations.

Two electrodynamic vibration sensors 14, 16 extend between the two measuring tubes A and B, in each case at an inlet-side and at an outlet-side section thereof. An electrodynamic vibration sensor comprises a plunger coil and a permanent magnet. The plunger coil is arranged on a measuring tube, and the permanent magnet is arranged on the opposite measuring tube. The relative movements of the coil and magnet caused by the measuring tube vibrations cause changes in the magnetic flux at the location of the coil, and induction voltages associated therewith. This means that the two vibrations sensors 14 16 can each be used to detect a change in distance between the two measuring tubes A in the form of a velocity-proportional voltage signal. This is initially an analog measurement signal in each case. The excitation of the exciter 8 as a result of the application of a corresponding excitation voltage and the processing and evaluation of the analog measurement signals provided by the vibration sensors 14, 16 take place by an appropriately designed operating and evaluation circuit 18, which is shown in FIG. 1 only schematically by a box.

A phase difference $\Delta\varphi(t)$ of the vibrations of the two measuring tubes A between the two measuring points formed by the vibration sensors 14, 16 is to be determined in order to ascertain measured values of the mass flow rate $\dot{m}(t)$. The mass flow rate of the fluid flowing in the pipeline can be determined in particular, as is known to the person skilled in the art, from this phase difference $\Delta\varphi(t)$ as follows:

$$\dot{m}(t):=k\cdot\tan(\Delta\varphi(t)/2)/(2\pi\cdot f),$$

where k is a constant specific to the respective measuring device, and f describes the current vibration frequency of the measuring tubes.

In order to determine a sequence $\Delta\varphi=\Delta\varphi(t_i)$ of discrete values of the phase difference $\Delta\varphi(t)$, the operating and evaluation circuit 18 determines, from the analog measurement signals provided by the vibration sensors 14, 16, the respective phase information $\varphi_1(t_i)$, $\varphi_2(t_i)$ of the vibration of the two measuring tubes A, B at the measuring points formed by the two vibration sensors 14, 16. For this purpose, especially, the analog measurement signals provided in each case by the vibration sensors 14, 16, which are generally formed by a sensor voltage corresponding to the relative velocities of the vibrating measuring tubes, can be sampled at a high sampling frequency, for example at 40 kHz. As a result, a time-discrete, one-dimensional measurement signal having a temporal sequence of measured values is obtained. As a rule, the individual measured values of the sequence are also quantized in order to enable digital processing. Furthermore, in the present embodiment, each measurement signal is converted into an analytical signal, consisting of a real component $R(t_i)$ and an imaginary component $I(t_i)$. For this purpose, two filters having a phase difference of 90° may, for example, be used in parallel in a known manner. Furthermore, the present exemplary embodiment provides that the data rate of the analytical signal is reduced. This can be done, for example, via corresponding decimation stages. From the analytic signal, as is familiar to the person skilled in the art, (time-dependent) amplitude information $A_1(t_i)$, $A_2(t_i)$ and (time-dependent) phase information $\varphi_1(t_i)$, $\varphi_2(t_i)$ of the vibration of the two measuring tubes A, B can be obtained, respectively, at the respective measuring point. The phase difference $\Delta\varphi_i=\Delta\varphi(t_i)$ between the two measuring points formed by the vibration sensors 14, 16 can be obtained by forming the difference of the phase information $\varphi_1(t_i)$, $\varphi_2(t_i)$ of the vibrations detected by the two vibration sensors 14, 16. Since the signal processing in the present embodiment takes place substantially digitally, the respective processed measurement signals are time-discrete so that specific points in time $t_i$ are referred to in each case.

The operating and evaluation circuit 18, in general, evaluates the amplitude information $A_1(t_i)$, $A_2(t_i)$ as well as the phase information $\varphi_1(t_i)$, $\varphi_2(t_i)$. Especially, the excitation of the measuring tubes A by the exciter 8 is controlled in each case as a function of these variables.

Accordingly, a density of the medium located in the measuring tubes of the measuring pick-up can be determined based on a wanted mode natural frequency f (t), using $$\rho(t)=\rho(f(t)).$$

The Coriolis mass flow meter 2 according to the invention furthermore comprises a central electrodynamic vibration sensor 17, which detects the deflection of the measuring tubes A with respect to one another at the apex of the measuring tube arcs in a symmetrical manner, in relation to the longitudinal direction of the measuring tubes. The central vibration sensor has substantially the same design as the inlet-side and outlet-side vibration sensors. Correspondingly, the central vibration sensor 17 also supplies a velocity-proportional voltage signal. The phase information $\varphi_2(t_i)$ thereof is obtained by the operating and evaluation circuit 18 in accordance with the method described for the signals of the inlet-side and outlet-side vibration sensors 14, 16.

The operating and evaluation circuit 18 further ascertains a sequence of central phase difference values $\Delta\varphi_2(t_i)$ between the phase $\varphi_2(t_i)$ of the central vibration sensor and a symmetric function $S_{1,2}(\varphi_1(t_i), \varphi_2(t_i))$ of the phases $\varphi_1(t_i)$, $\varphi_2(t_i)$ the signals of the inlet-side and the outlet-side vibration sensors 14, 16, i.e. $\Delta\varphi_2(t_i)=\varphi_2(t_i)-S_{1,2}(\varphi_1(t_i), \varphi_2(t_i))$, wherein the latter function, for example, forms the arithmetic mean of the arguments thereof, i.e., $S_{1,2}(\varphi_1(t_i), \varphi_2(t_i)):=(\varphi_1(t_i), \varphi_2(t_i))/2$.

Based on this central phase difference $\Delta\varphi_2(t_i)$, the operating and evaluation circuit 18, as an intermediate step for the viscosity determination, can calculate an apparent mass flow according to $\dot{m}_s(t_i):=k\cdot\tan(\Delta\varphi_2(t_i)/2)/(2\pi\cdot f)$, where f is the current vibration frequency of the excited bending vibration wanted mode. Of course, the apparent mass flow is $\dot{m}_s(t_i)$ has nothing to do with the actual mass flow, since the arguments of the function $\Delta\varphi_2(t_i)$ have been freed of all flow-proportional, antisymmetric proportions. However, depending on the present implementation of algorithms, it may be advantageous to work with the apparent mass flow, which is substantially proportional to the quotient of the central phase difference $\Delta_2(t_i)$ and the current vibration frequency.

If the central phase difference $\Delta\varphi_2(t_i)$ depends on the viscosity of a medium present in the measuring tubes, an approach is provided for ascertaining a viscosity value of the medium based on a current value of the central phase difference $\Delta\varphi_2(t_i)$ or an apparent mass flow is $\dot{m}_s(t_i)$.

Figure 2:
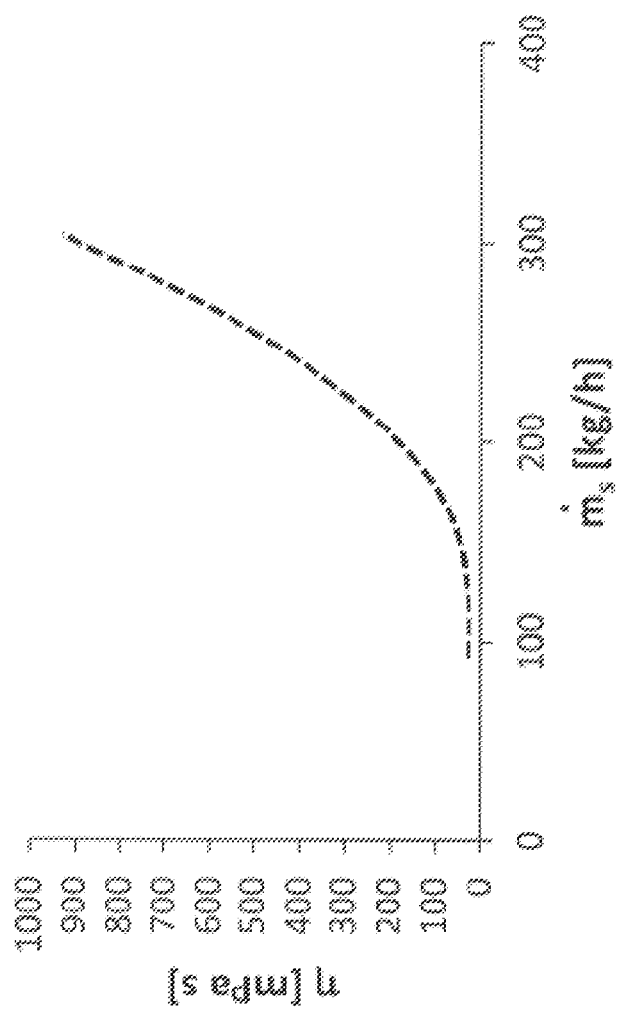
FIG. 2 shows a diagram of the viscosity as a function of apparent mass flow.

For mixtures of water and glycerol, aqueous media with media having viscosities between 1 and 900 mPa s, apparent mass flows $\dot{m}_s(\eta)$ of approximately 100 to 300 kg/h were measured. Based on these measurements, a quadratic function $\eta(\dot{m}_s)$ has been implemented in the operating and evaluation circuit 18, which calculates the dynamic viscosity q as a function of the apparent mass flow. FIG. 2 schematically illustrates the implemented function with which viscosity values can be calculated and signaled by the operating and evaluation circuit.

FIG. 3 shows, in summary, an exemplary embodiment of the method 100 according to the invention.

The method begins with the excitation of bending vibrations 110 of the measuring tubes A of the pair of measuring tubes of the Coriolis mass flow meter 2 shown in FIG. 1 in a symmetrical bending vibration wanted mode by means of the electrodynamic exciter arranged in the measuring tube center.

This is followed by the detection of 120 sensor signals of the central vibration sensor; and the detection 130 of sensor signals of the inlet-side vibration sensor and an outlet-side vibration sensor.

Based on the sensor signals, a phase relationship or time delay between the sensor signals of the central vibration sensor and a symmetric function of the sensor signals of the inlet-side and outlet-side vibration sensors is ascertained 140.

For this purpose, first, a mean value of the point in time of the zero crossings of the inlet-side and outlet-side sensors is formed as a symmetric function of the sensor signals, so as to then calculate the difference between the point in time of the zero crossing of the central vibration sensor and the determined mean value. Likewise, the differences between the point in time of the zero crossing of the central sensor and the point in time of the zero crossing of the inlet-side or outlet-side sensor can initially be formed first, followed by finding a mean value. In this case as well, the result obtained is a time delay between the sensor signals of the central vibration sensor and a symmetric function of the sensor signals of the inlet-side and outlet-side vibration sensors.

Based on the time delay, an apparent mass flow is ascertained in an (optional) step 145.

Based on the apparent mass flow, the viscosity is determined 150 by calculation, using the quadratic function shown in FIG. 2.

The ascertained viscosity value can be signaled to a higher-level unit, displayed on a display unit, and/or used to compensate for cross sensitivities of further measured values with respect to the viscosity, for example a density.

The invention claimed is:

1. A method for determining the viscosity of a medium using a Coriolis mass flow meter, the method comprising:
    exciting bending vibrations of at least one measuring tube of the mass flow meter in a symmetrical bending vibration wanted mode using an exciter arranged symmetrically in relation to a longitudinal direction of the measuring tube, wherein the measuring tube is used to guide the medium between an inlet opening and an outlet opening of the measuring tube;
    detecting sensor signals of a central vibration sensor, wherein the central vibration sensor is arranged symmetrically in relation to a longitudinal direction of the measuring tube;
    detecting sensor signals of an inlet-side vibration sensor and an outlet-side vibration sensor, wherein, in relation to the longitudinal direction of the measuring tube, the positions of the inlet-side and outlet-side vibration sensors are arranged symmetrically with respect to one another;
    ascertaining a phase relationship or time delay between the sensor signals of the central vibration sensor and a symmetric function of the sensor signals of the inlet-side and outlet-side vibration sensors; and
    ascertaining the viscosity of the medium as a function of this phase relationship or time delay.

2. The method according to claim 1, wherein the ascertainment of a phase relationship or time delay between the sensor signals of the central vibration sensor and a symmetric function of the sensor signals of the inlet-side and outlet-side vibration sensors comprises:
    ascertaining the point in time of the zero crossing of the measuring tube at the location of the exciter by means of the central vibration sensor;
    ascertaining the points in time of the zero crossings of the measuring tube at the positions of the inlet-side vibration sensor and the outlet-side vibration sensor; and
    ascertaining a time delay between a mean point in time of the zero crossings of the inlet-side and outlet-side vibration sensors and the point in time of the zero crossing of the measuring tube in the measuring tube center.

3. The method according to claim 1, wherein the viscosity is calculated as a function of the phase relationship or time delay, the function including a polynomial.

4. The method according to claim 1, wherein the phase relationship or delay has a cross sensitivity to the density of the medium, a density measurement value for the medium being determined based on a vibration frequency of the bending vibration wanted mode, including a wanted mode natural frequency, and this cross sensitivity being taken into account in the ascertainment of the viscosity.

5. The method according to claim 1, further comprising:
    calculating an apparent mass flow measured value based on the phase relationship or delay; and
    determining the viscosity based on the apparent mass flow measurement value.

6. The method according to claim 1, wherein the viscosity is ascertained at a mass flow rate of zero.

7. A Coriolis mass flow meter, comprising:
    a measuring tube, mounted so as to be able to vibrate, for guiding a medium between an inlet-side opening of the measuring tube and an outlet-side opening of the measuring tube;
    an exciter for exciting bending vibrations of the measuring tube in a symmetrical bending vibration wanted mode, wherein the exciter is arranged symmetrically in relation to a longitudinal direction of the measuring tube;
    a central vibration sensor, wherein the central vibration sensor is arranged symmetrically in relation to a longitudinal direction of the measuring tube;
    an inlet-side vibration sensor and an outlet-side vibration sensor, wherein, in relation to the longitudinal direction of the measuring tube, the positions of the inlet-side and outlet-side vibration sensors are arranged symmetrically with respect to one another; and
    an operating and evaluation circuit, which is configured to:
        emit an exciter signal for driving the exciter for exciting bending vibrations of the measuring tube in a symmetrical bending vibration wanted mode;
        detect sensor signals of the central vibration sensor;
        detect sensor signals of the inlet-side vibration sensor and the outlet-side vibration sensor;
        ascertain a phase relationship or time delay between the sensor signals of a central vibration sensor and a symmetric function of the sensor signals of the inlet-side and outlet-side vibration sensors; and
        ascertain the viscosity of the medium as a function of this phase relationship or time delay.

8. The Coriolis mass flow meter according to claim 7, wherein the measuring tube is bent in the rest position thereof.

9. The Coriolis mass flow meter according to claim 7,
    wherein the phase relationship or delay has a cross sensitivity to the density of the medium,
    wherein the operating and evaluation circuit is further configured to determine a density measurement value for the medium based on a vibration frequency of the bending vibration wanted mode, including a wanted mode natural frequency, and to take the cross sensitivity into account in the ascertainment of the viscosity.

10. The Coriolis mass flow meter according to claim 7, wherein the operating and evaluation circuit is further configured to first calculate an apparent mass flow measurement value based on the phase relationship or delay, and then to determine the viscosity based on the apparent mass flow measurement value.

\* \* \* \* \*